(12) United States Patent
Gover et al.

(10) Patent No.: US 11,702,951 B1
(45) Date of Patent: Jul. 18, 2023

(54) PASSIVE COOLING SYSTEM FOR TIP CLEARANCE OPTIMIZATION

(71) Applicant: PRATT & WHITNEY CANADA CORP., Longueuil (CA)

(72) Inventors: Christopher Gover, Longueuil (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/806,394

(22) Filed: Jun. 10, 2022

(51) Int. Cl.
| | |
|---|---|
| *F01D 11/14* | (2006.01) |
| *F01D 11/24* | (2006.01) |
| *F01D 25/14* | (2006.01) |
| *F02C 7/18* | (2006.01) |
| *F01D 11/16* | (2006.01) |

(52) U.S. Cl.
CPC ............. *F01D 11/24* (2013.01); *F01D 11/16* (2013.01); *F01D 25/14* (2013.01); *F02C 7/18* (2013.01); *F05D 2220/323* (2013.01); *F05D 2240/14* (2013.01); *F05D 2260/201* (2013.01)

(58) Field of Classification Search
CPC .......... F01D 11/24; F01D 25/14; F01D 11/20; F01D 11/025; F01D 11/14; F01D 11/16; F01D 11/18; F02C 7/18; F05D 2220/323; F05D 2240/14; F05D 2260/201
See application file for complete search history.

(56) References Cited

U.S. PATENT DOCUMENTS

| | | | |
|---|---|---|---|
| 10,822,991 B2 | 11/2020 | Clarke et al. | |
| 10,920,602 B2 | 2/2021 | Sitler et al. | |
| 11,047,258 B2 | 6/2021 | Whittle et al. | |
| 2018/0073435 A1 | 3/2018 | Chen et al. | |
| 2020/0208533 A1* | 7/2020 | Kapadia | F01D 11/18 |

* cited by examiner

*Primary Examiner* — Jacob M Amick
(74) *Attorney, Agent, or Firm* — Norton Rose Fulbright Canada LLP (57) ABSTRACT

A turbine assembly in a turbine section of an aircraft engine includes a rotor with blades having blade tips, and a turbine housing radially surrounding the blades. A distance between an inner surface of the housing and the blade tips defines a tip clearance gap. A passive cooling system for optimizing the tip clearance gap includes a cooling airflow passage located radially outward from, and in heat-transfer with, the turbine housing. The cooling airflow passage has an inlet opening located upstream of the rotor and an exit opening located downstream of the rotor. The inlet opening provides air flow into the cooling airflow passage. The exit opening provides air flow communication between the cooling airflow passage and a main gaspath of the turbine section. A flow of cooling air through the cooling airflow passage is induced, to cool the housing.

20 Claims, 3 Drawing Sheets

PASSIVE COOLING SYSTEM FOR TIP CLEARANCE OPTIMIZATION

TECHNICAL FIELD

The present disclosure relates generally to aircraft engines and, more particularly, to systems and methods for optimizing the tip clearance for rotors of such engines.

BACKGROUND

Compressors and turbines of gas turbine engines comprise rotating turbo-machinery having a plurality of rotor blades, including for example axial compressors, centrifugal compressors (i.e. impellers) and turbines. One source of inefficiency of such compressor rotors and/or turbine rotors is caused by tip leakage flow, whereby gas escapes through the radial tip clearance gap formed between the tips of the rotating rotor blades and the surrounding casing or shroud. Particularly within the hot section of the engine, the amount of thermal growth of the rotating components (e.g. turbine blades) and the static components (e.g. turbine housing) can differ, resulting in undesirable changes in the tip clearance between the turbine blades and the surrounding housing.

SUMMARY

There is accordingly provided a turbine assembly in a turbine section of an aircraft engine, comprising: a turbine rotor including a hub and turbine blades extending outward from the hub to blade tips; a turbine housing circumferentially extending and radially surrounding the turbine rotor, the turbine housing having an inner surface facing the blade tips of the turbine blades, a distance between the inner surface of the turbine housing and the blade tips of the turbine blades defining a tip clearance gap; and a passive cooling system for optimizing the tip clearance gap, the passive cooling system including: a cooling airflow passage located radially outward from the turbine housing, the cooling airflow passage being in heat-transfer communication with the turbine housing, an inlet opening of the cooling airflow passage being located upstream of the turbine rotor and an exit opening of the cooling airflow passage being located downstream of the turbine rotor, the inlet opening providing air flow communication between a plenum receiving a cooling air and the cooling airflow passage, the exit opening located downstream of the turbine rotor and providing air flow communication between the cooling airflow passage and a main gaspath of the turbine section, the exit opening exposed to combustion gases flowing through the main gaspath past the exit opening to generate a local depression at the exit opening, the local depression defining a static pressure at the exit opening that is less than a static pressure of the cooling air at the inlet opening to induce a flow of the cooling air through the cooling airflow passage, thereby cooling the turbine housing.

The turbine assembly and passive cooling system as defined above and described herein may further include one or more of the following features, in whole or in part, and in any combination.

In certain aspects, the plenum is in air flow communication with a source of cooling air that provides non-core air drawn from outside a core of the aircraft engine.

In certain aspects, the inlet opening comprises a plurality of apertures that are circumferentially distributed and extend through a plenum wall that at least partially encloses the plenum receiving the cooling air.

In certain aspects, the exit opening comprises a plurality of apertures that are circumferentially distributed and extend through the turbine housing downstream of the turbine rotor.

In certain aspects, the turbine housing at least partially defines the cooling airflow passage, with a radially outer surface of the turbine housing forming a boundary of the cooling airflow passage and being directly exposed to the cooling air flowing therewithin.

In certain aspects, uninterrupted conductive heat transfer occurs between the radially outer surface of the turbine housing and the radially inner surface of the turbine housing.

In certain aspects, the cooling airflow passage includes a converging portion and a diverging portion in serial flow communication within the cooling airflow passage.

In certain aspects, the converging portion and the diverging portion are located at an axial location of the turbine housing adjacent the blade tips of the turbine blades to increase velocity of the cooling air flowing through the cooling airflow passage near the blade tips.

In certain aspects, a casing is located radially outward of the cooling airflow passage and at least partially defines an outer boundary of the cooling airflow passage, the casing being cooled by the cooling air flowing through the cooling airflow passage.

There is also provided an aircraft engine comprising: a compressor section, a combustor and a turbine section, in serial flow communication, defining a core of the aircraft engine; the turbine section including a turbine rotor, the turbine rotor including a hub mounted to an engine shaft for rotation therewith about a central axis, the turbine rotor including turbine blades extending outward from the hub to blade tips, the turbine blades projecting through a main gaspath of the turbine section and rotating with the hub about the central axis; a turbine housing circumferentially extending and radially surrounding the turbine rotor, the turbine housing having an inner surface facing the main gaspath and being adjacent to the blade tips of the turbine blades, a distance between the inner surface of the turbine housing and the blade tips of the turbine blades defining a tip clearance gap; and a cooling airflow passage located radially outward from the turbine housing and outside the main gaspath, the cooling airflow passage being in heat-transfer communication with the turbine housing, the cooling airflow passage including an inlet opening located upstream of the turbine rotor and providing air flow communication between a source of cooling air and the cooling airflow passage, the source of cooling air providing non-core air from outside the core of the aircraft engine, the cooling airflow passage including an exit opening located downstream of the turbine rotor and providing air flow communication between the cooling airflow passage and the main gaspath downstream of the turbine rotor, wherein a pressure differential between the inlet opening and the exit opening induces a flow of the non-core air to flow through the cooling airflow passage from the inlet opening to the exit opening.

The aircraft engine and passive cooling system as defined above and described herein may further include one or more of the following features, in whole or in part, and in any combination.

In certain aspects, the inlet opening provides air flow communication between a plenum located at least partially radially outward of the cooling airflow passage, the plenum receiving the non-core air from the source of cooling air therein.

In certain aspects, the source of cooling air feeding the plenum includes at least one of: a bypass duct of the aircraft engine; a take-off port located in an outer engine casing or in a nacelle of the aircraft engine; and an external air source outside the aircraft engine.

In certain aspects, the inlet opening comprises a plurality of apertures that are circumferentially spaced apart.

In certain aspects, the exit opening comprises a plurality of apertures that are circumferentially distributed and extend through the turbine housing downstream of the turbine rotor.

In certain aspects, the turbine housing at least partially defines the cooling airflow passage, with a radially outer surface of the turbine housing forming a boundary of the cooling airflow passage and being directly exposed to the cooling air flowing therewithin.

In certain aspects, uninterrupted conductive heat transfer occurs between the radially outer surface of the turbine housing and the radially inner surface of the turbine housing.

In certain aspects, the cooling airflow passage includes a converging portion and a diverging portion in serial flow communication within the cooling airflow passage.

In certain aspects, the converging portion and the diverging portion are located at an axial location of the turbine housing adjacent the blade tips of the turbine blades to increase velocity of the cooling air flowing through the cooling airflow passage near the blade tips.

There is further provided a method of optimizing tip clearance between blades of a rotor and a surrounding housing in an aircraft engine, the method comprising: cooling the housing by directing a flow of cooling air through a cooling airflow passage, the cooling air passage being located radially outward from the housing and outside a main gaspath directing combustion air through the blades of the rotor, the directing of the flow of cooling air through the cooling air passage includes passively inducing the flow of cooling air through the cooling air passage due to a pressure differential between a first static pressure at an inlet opening of the cooling airflow passage and a second static pressure at an exit opening of the cooling airflow passage, the exit opening feeding the flow of cooling air into the main gaspath at a location downstream of the rotor.

The method defined above and describe herein may further include directing the cooling air into the cooling airflow passage, via the inlet opening, from a source of non-core air, the source of non-core air being at lower speed and a lower temperature than the combustion air flowing through the main gaspath.

BRIEF DESCRIPTION OF THE DRAWINGS

Reference is now made to the accompanying figures in which.

DETAILED DESCRIPTION

Figure 1:
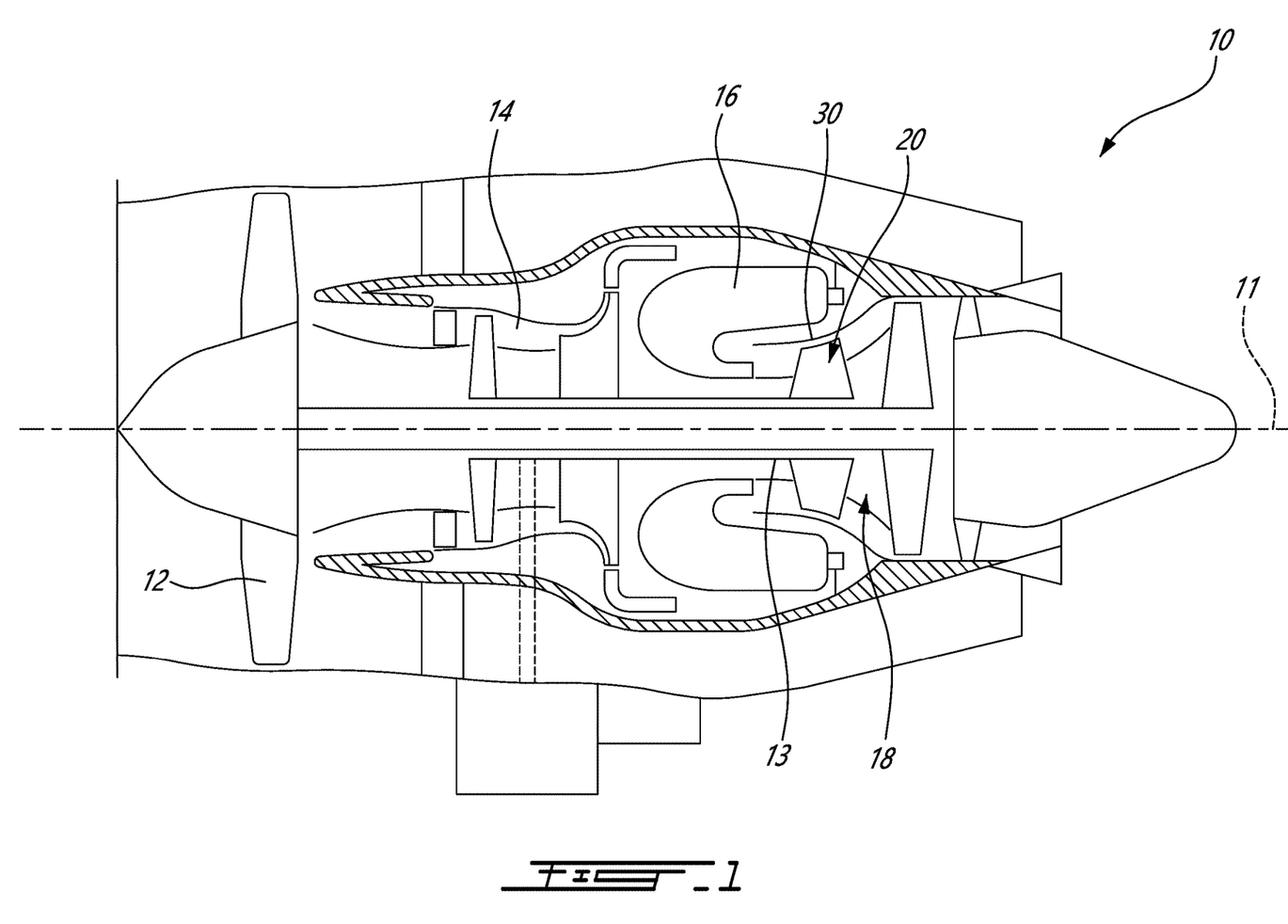
FIG. 1 is a schematic cross sectional view of an aircraft engine.

FIG. 1 illustrates an aircraft engine 10 (or simply "engine" 10), which in this embodiment is a turbofan gas turbine engine, of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 of the gas turbine engine 10 may be a multi-stage turbine, and thus may comprise several turbine rotors 20 rotate about a central axis 11. Although the present disclosure will focus on systems/configurations and methods for optimizing the tip clearance between a turbine rotor 20 and its surrounding turbine housing 30, it is to be understood that the principles described herein may also be applied to corresponding components of other rotors within the engine 10, such as an axial or centrifugal compressor, or other rotating components.

Figure 2:
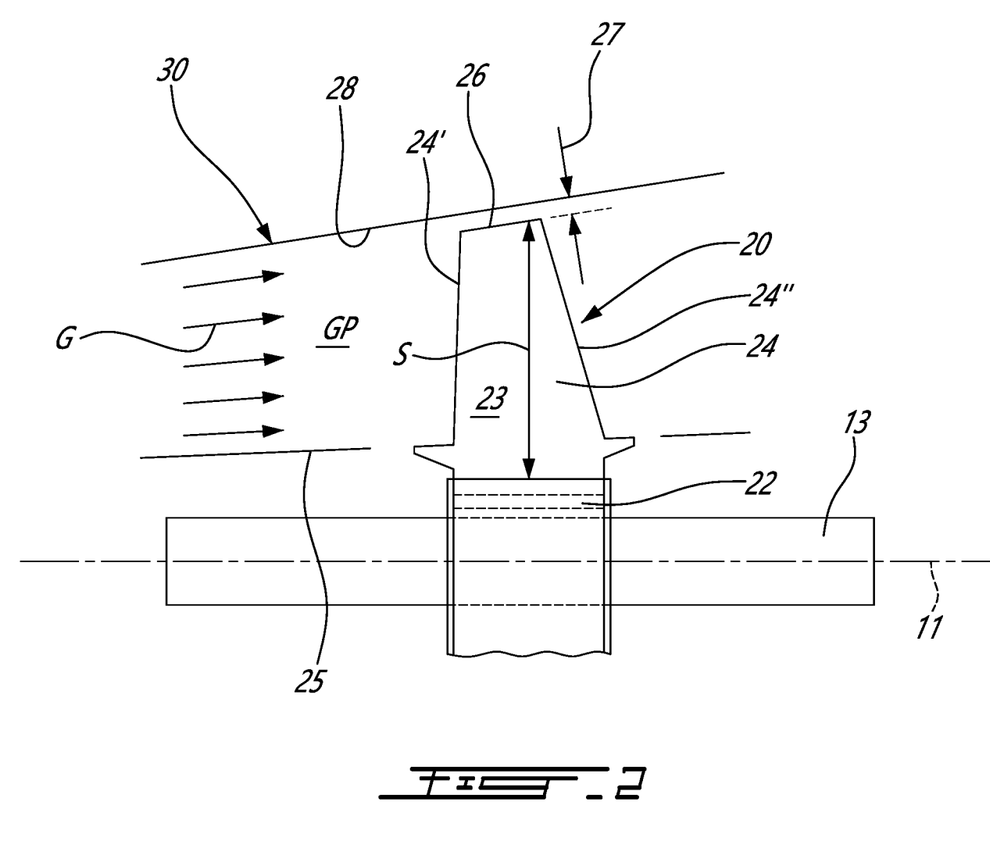
FIG. 2 is a schematic view of a turbine rotor of the turbine section of the aircraft engine of FIG. 1, showing the tip clearance.

Referring to FIG. 2, an unshrouded turbine rotor 20 of the turbine section 18 is shown within a main gaspath GP of the turbine section 18, which is defined between a radially inner gaspath boundary 25 and a radially outer gaspath boundary 28, and has hot combustion gasses flowing in direction G therethrough. The radially outer gas path boundary in this embodiment is defined by inner surface 28 of the turbine housing 30. The turbine rotor 20 includes a plurality of turbine blades 24 which are circumferentially distributed about a hub 22, which is in turn mounted to an engine shaft 13 for rotation therewith. The turbine blades 24 extend outwardly from the hub 22, in direction away from the central axis 11, along a blade span S, to turbine blade tips 26 at their radially outer end. It is to be understood that the turbine blades 24 may extend in a generally radial direction, although they need not be perfectly radial relative to the central axis 11. As it well understood, each of the turbine blades 24 includes a leading edge 24' and a trailing edge 24", and a pressure side surface and a suction side surface of the airfoil 23 formed by the blade 24. The turbine blade tips 26 accordingly extend, in a generally axial and/or flow-wise direction, between the leading edge 24' and the trailing edge 24" of the blade 24, at the radially outermost remote tip of the airfoil 23.

The stationary outer turbine housing 30, which extends circumferentially and radially surrounds the rotor blades 24 of the turbine rotors 20, includes an inner surface 28 that faces and is exposed to the hot combustion gases flowing through the main gaspath GP, the inner surface 28 of the turbine housing 30 being proximate the blade tips 26 of the rotor blades 24. A distance or gap between this inner surface 28 of the turbine housing 30 and the radially-outermost surfaces of the blade tips 26 defines the blade tip clearance gap 27 (which may also be referred to herein as the blade tip clearance). This distance may, for example, be measured in a substantially radial direction, between the blade tips 26 and the inner surface 28 of the turbine housing 30.

During operation of the engine 10, significant thermal growth differential can occur between the turbine rotor 20, which is disposed in the hot combustion gas path GP of the turbine section 18, and the surrounding turbine housing 30. This thermal growth differential can cause changes in the blade tip clearance 27, which is defined as the gap between the outer tips 26 of the turbine blades 24 of the turbine rotor 20 and the inner surface 28 of the surrounding turbine housing 30 which is located radially outward from the turbine rotor 20. In certain embodiments, the blade tip clearance gap may be measured in a generally radial direction, although it is to be understood that this blade tip clearance gap between the tips 26 of the turbine blades 24 and the surrounding turbine housing 30 may have both axial and radial components, albeit with the radial component of the gap being greater than the axial component of the gap. These changes in the blade tip clearance 27 may occur due to differences in thermal expansion between the outer gas path surface (in this case the turbine housing 30) and the rotating blades 24 of the turbine rotor 20.

In use, each turbine rotor 20 rotates at high speed about the central axis 11, and is exposed to high temperatures of the combustion gases flowing in direction G within the main gaspath GP. Tip leakage through the blade tip clearance 27 can impair efficiency of the engine 10, because the turbine section 18 is not able to extract as much energy from the combustion gases as it could if no or less tip leakage occurred. When the blade tip clearance 27 increases, the efficiency of the engine 10 decreases as gas leakage around the tips 26 of the turbine blades 24 increases. Gas leakage at the blade tip has a direct impact on engine performance and the fuel efficiency. For example, in an exemplary embodiment, high pressure turbine blade tip clearance can be approximately 0.010" at the design point and a minimum high pressure turbine tip clearance can be 0.008" throughout the rest of the operating envelope. A turbine blade tip clearance increase of +0.010" can be equivalent to approximately 1.2% efficiency decrease for the high pressure turbine. In off-design conditions (idling, low altitude etc.) the turbine tip clearance can increase by as much as +0.020", resulting in efficiency losses of 2-3%. It is therefore desirable to be a able to optimize the blade tip clearance 27, in order to prevent and/or reduce the likelihood of the blade tip clearance 27 increasing during phases of flight during which such increase would be undesirable, such as during cruise for example.

Figure 3:
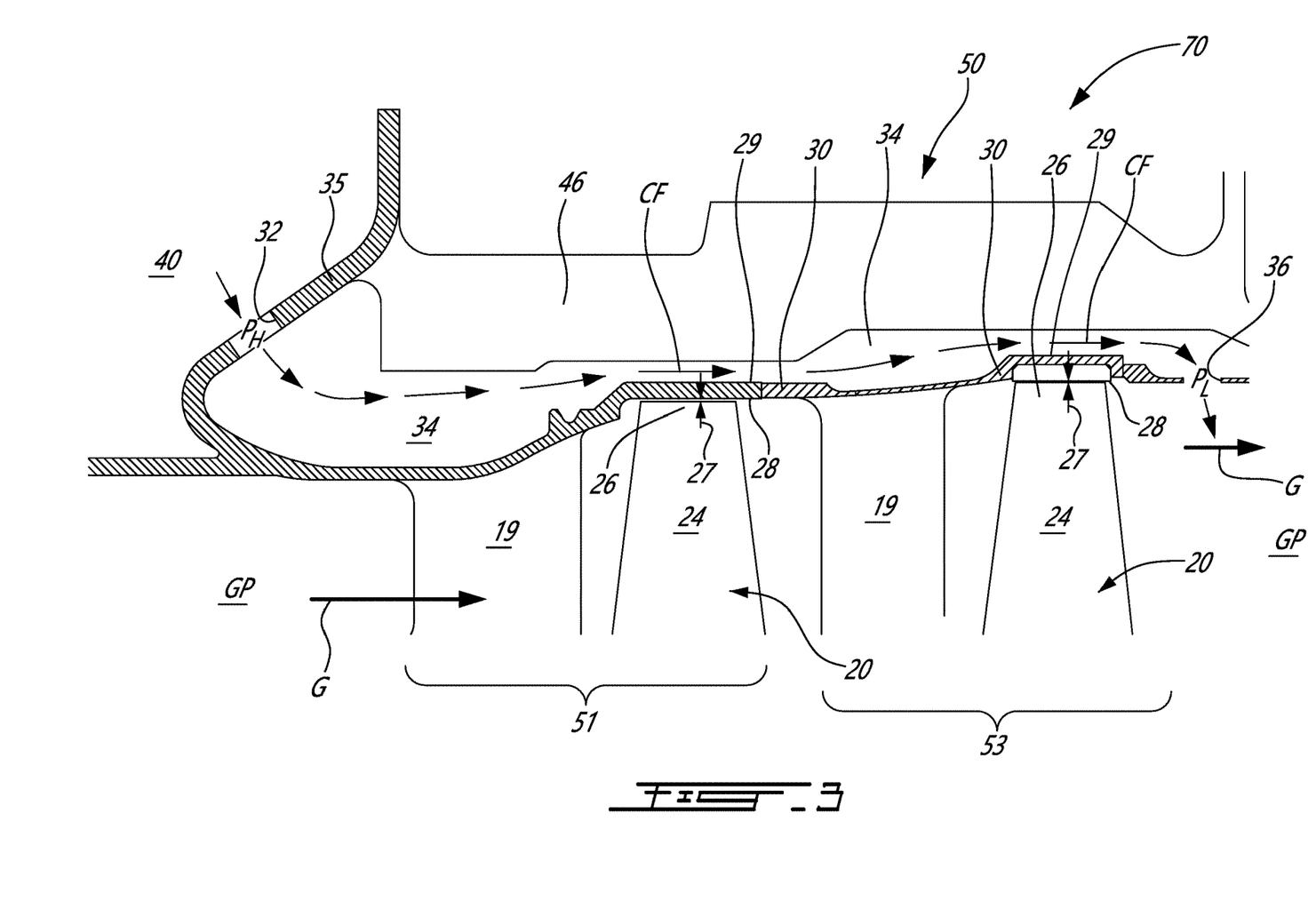
FIG. 3 is a schematic partial cross-sectional view of the turbine section of the aircraft engine of FIG. 1.

Referring now to FIG. 3, the turbine section 18 of the engine 10 includes a turbine assembly 70 that includes a passive cooling system 50, as will be described below, which is operable to optimize turbine blade tip clearance. The turbine assembly 70 includes a first turbine stage 51 and a second turbine stage 53, each of which includes a upstream turbine stator 19 which is stationary and a downstream turbine rotor 20 which rotates. In the embodiment shown, the turbine rotors 20 of the first and second turbine stages 51, 53 form part of the high-pressure turbine section of the engine 10, however it is to be understood that they could alternately be high and low pressure turbines, respectively, and thus connected to different shafts of the engine. As will be readily appreciated by those skilled in the art, the turbine stator 19 includes a plurality of stationary vanes which are circumferentially distributed about the annular gas path GP through which the hot combustion gases flow in direction G. As noted above, the turbine rotor 20 includes a plurality of turbine blades 24 which extend outwardly to turbine blade tips 26.

In one particular embodiment, the turbine blades 24 of the turbine rotor 20 may be replaceable, and as such are removably mounted to the hub 22 (see FIG. 2) of the turbine rotor 20 by known configurations. Alternately, the turbine rotor 20 described herein may be an integrally bladed rotor (IBR), whereby the rotor blades 24 and the hub 22 are integrally formed as a single, monolithic part, and in which case the individual blades 24 are not removable from the hub.

Referring still to FIG. 3, the turbine rotors 20 rotate within a surrounding, and circumferentially extending, turbine housing 30 which defines the radially outer gas path boundary. The blade tip clearance 27 is the gap between the outer tips 26 of the turbine blades 24 of the turbine rotors 20 and the inner surface 28 (facing towards and exposed to the hot gas path GP) of the turbine housing 30.

The passive cooling system 50 of FIG. 3 also includes a cooling airflow passage 34 which is disposed radially outward from the turbine housing 30 and is therefore outside the main gas path GP. The cooling airflow passage 34 is in heat-transfer communication with the turbine housing 30, and more particularly it is in direct heat-transfer communication therewith whereby there are no intermediate components therebetween. Stated differently, the radially outer surface 29 of the turbine housing 30 at least partially defines the cooling airflow passage 34, and forms a radially inner boundary of the cooling airflow passage 34. Thus, turbine housing 30 at least partially defines the cooling airflow passage 34, and the radially outer surface 29 of the turbine housing 30 is directly exposed to the cooling airflow CF that flows through the cooling airflow passage 34. The radially inner surface 28 of the turbine housing, opposite from the radially outer surface 29, is directly exposed to the hot combustion gasses flowing through the main gaspath GP. Thus, uninterrupted conductive heat transfer occurs between the (cool) radially outer surface 29 of the turbine housing 30 and the (hot) radially inner surface 28 of the turbine housing 30.

The cooling airflow passage 34 extends generally annularly, although it may be circumferentially interrupted at one or more circumferential locations. Additionally, although the cooling airflow passage 34 will be referred to herein in the singular, it is to be understood that several distinct cooling airflow passages 34 may be provided, each extending, for example, about only a portion of the circumference of the turbine housing. Flow communication between the separate cooling airflow passages 34 may be permitted or, in another alternatively, each may be separately fed cooling air for flow therethrough.

As will be explained in further detail, this cooling airflow passage 34 receives a flow of cooling air CF therethrough, in a direction substantially corresponding to the direction of hot combustion gases G (e.g. from left to right in the image of FIG. 3), which acts to cool the radially outer surface 29 of the turbine housing 30. The cooling air CF is air which is not extracted from main gas path of the compressor section 14 of the engine 10, and therefore the performance penalty associated with the extraction of the cooling air CF is less than if the air used for cooling the turbine shroud would have been extracted, for example, from the high pressure main gas path within the compressor section 14 of the engine 10. Rather, in the depicted embodiment, the cooling air CF that flows through the cooling airflow passage 34 is drawn from a plenum 40 located outside the main gaspath GP of the engine. The cooling air within plenum 40 is relatively low speed (i.e. relative to the speed of air flowing within the main gaspath GP within either the compressor section 14 or the turbine section 18 of the engine 10) and/or is substantially stagnant air. Accordingly, this cooling air is low velocity and low temperature air that is drawn into the plenum 40 from: air outside the core of the engine 10 (e.g. air within bypass duct of the engine 10); ambient air outside the engine 10 or outside a nacelle within which the engine is mounted when on the aircraft (which may for example be drawn off using a take-off port in an outer casing of the engine or in the nacelle); other air sources within the engine 10 outside the main gaspath GP; and/or other air sources inside or outside the core of the engine 10 provided that work has not been done on this air by the turbomachinery of the engine. The cooling air from the plenum 40 which is used for cooling as described herein may accordingly be referred to as "non-core" air.

The cooling air CF flowing through the cooling airflow passage 34 has a temperature that is lower than that of the hot combustion gases flowing through the main gaspath GP within the turbine section 18, and therefore the cooling air CF flowing through the cooling airflow passage 34 acts to cool the turbine housing 30 (and more specifically the outer surface 29 of the turbine housing 30, which thus cools the rest of the turbine housing 30). This, in turn, optimizes the blade tip clearance 27 by reducing or limiting the thermal growth differential between the turbine housing 30 and the turbine blades 24 during at least certain phases of engine operation and/or certain flight phases or conditions, such as but not limited to, take-off and cruise for example. It is however to be understood that in certain particular circumstances, such as during an in-flight re-light of the engine or during assembly or repair of a engine when it is therefore cold, it can be desirable to in fact maximize the tip clearance between the rotor blades and the surrounding housing such as to avoid unwanted rubbing or contact between the parts. The term "optimization" of the blade tip clearance 27 as used herein is therefore intended to mean any one or more of the following: limiting relative thermal growth differential between the blade tips and the surrounding housing during engine operation; reducing the blade tip clearance gap during engine operation; preventing increases in the blade tip clearance during engine operation; limiting increases in the blade tip clearance during engine operation; keeping the blade tip clearance within a predetermined range throughout one or more flight phases; and maintaining the blade tip clearance within a range of ±5-10% of a design point tip clearance. Additionally, any of the preceding ways in which the present passive cooling system 50 is able to optimize the blade tip clearance 27, may further be true during one or more specific flight conditions or phases of operation of the engine, such as for example during steady state operation of the engine in flight (e.g. during cruise of the aircraft), during take-off of the aircraft, etc. The precise blade tip clearance 27 can vary during engine operation due to a number of factors, such as the mass flow and temperature of both the core air gaspath flow GP and the cooling air flow CF, the specific material properties of the housing and the rotor blades, the environmental operating conditions of the engine/aircraft, etc. Additionally, the temperatures and flow rates of the cooling air flow CF and the core air gaspath flow GP will vary during engine operation as a function of the operating point of the engine. Given all of this, the present passive cooling system 50 is operable to optimize the blade tip clearance 27 in a manner that can improve blade tip clearance about 25% relative to a blade tip clearance between comparable blades and housing that are not cooled by the passive cooling system 50 as described herein. This improvement may be, for example, due to a reduction in the amount of thermal growth of the housing relative to an amount of thermal growth of the rotating blades.

The cooling of the turbine shroud 30 provided by the passive cooling system 50 is an entirely passive cooling system, in that it relies on the induced flow of the cooling air CF through the cooling airflow passage 34 and does not require any active flow generation devices (e.g. fans or pumps, valves, etc.), nor any active monitoring or control of the blade tip clearance of the type required in existing active blade tip clearance systems.

The cooling airflow passage 34 is disposed radially outward of the main gaspath GP, and thus radially outward of the turbine housing 30 which defines the radially outer boundary of the main gaspath GP through the turbine section 18 of the engine 10. The cooling airflow passage 34 extends, outside the main gas path GP, between an inlet opening 32 defined in a plenum wall 35 and an exit opening 36 defined in the turbine housing 30 at a location downstream of the turbine rotor(s) 20. The flow of cooling air CF therefore flows through the cooling airflow passage 34, from the inlet opening 32 to the exit opening 36. The inlet opening 32 is located, in the present embodiment, upstream of the turbine stator 19 of the first turbine stage 51. The exit opening 36 is disposed, in the present embodiment, in the turbine shroud 30 at a location downstream from the downstream turbine rotor 20 of the second turbine stage 53. In the depicted embodiment, therefore, the cooling airflow passage 34 extends between the inlet opening 32 and the exit opening 36, along a complete axial extent of the first and second turbine stages 51, 53. It is however to be understood that the cooling airflow passage 34 may, in other embodiments, extend along only one turbine rotor and/or turbine stage, or alternately across more than two turbine rotors and/or turbine stages. In the embodiment of FIG. 3, both turbine rotors 20 (e.g. first and second turbine rotors) of the first and second turbine stages 51, 53 are therefore located axially between the inlet opening 32 and the exit opening 36 of the cooling airflow passage 34. Stated differently, the cooling airflow passage 34 is axially aligned with one or more turbine rotors 20 of the turbine stages, 51, 53, such that the turbine rotor 20 is axially located between the upstream inlet opening 32 and the downstream exit opening 36 of the cooling airflow passage 34, such that the cooling air CF flowing through the cooling airflow passage 34 acts to cool the turbine shroud 30 located radially outward of the tips 26 of the turbine rotor 20.

As noted above, low speed or substantially stagnant cool air within the plenum 40 is passively drawn through the inlet opening 32 and into the cooling airflow passage 34. Thus, the inlet opening 32 provides air flow communication between the cooling airflow passage 34 and the cooling airflow passage 34. The exit opening 36 provides air flow communication between the cooling airflow passage 34 and the main gaspath GP within the turbine section 18 at a location downstream of one or more of the turbine rotors 20.

The exit opening 36 accordingly allows for the cooling air CF flowing within the cooling airflow passage 34 to exit the cooling airflow passage 34 and to flow into the main gas path GP. Because this introduction of the relatively cooler cooling air CF occurs downstream of the rotor(s) 20, there is minimal negative impact on the performance of the turbine rotors 20 (e.g. with respect to extracting energy from the hot combustion gases produced by the combustor and flowing through the main gaspath GP).

The flow of cooling air CF is passively drawn through the cooling airflow passage 34, from the inlet opening 32 to the exit opening 36, due to a pressure differential generated between the exit opening 36 and the inlet opening 32. More particularly, the relatively high speed flow of hot combustion gases within the main gas path GP, flowing in direction G, causes a local depression (i.e. a local region of low pressure) at the exit opening 36 of the cooling airflow passage 34. This local depression at the exit opening 36 has a static pressure $P_L$ that is less than a static pressure $P_H$ at the inlet opening 32. Thus, the flow of cooling air CF will tend to flow through the cooling airflow passage 34 from the region of high pressure $P_H$ (at the inlet opening 32) to the region of low pressure $P_L$ (at the exit opening).

Although the inlet opening 32 and the exit opening 36 may be referred to herein in the singular, it is to be understood that each of the inlet opening 32 and the exit opening 36 may comprise a plurality of discrete apertures, slots, passages or other similar openings that permit air flow communication between the plenum 40 and the cooling airflow passage 34 (in the case of the inlet opening 32) and between the cooling airflow passage 34 and the main gaspath GP (in the case of the exit opening 36). For example, the inlet opening 32 may comprise a series of apertures that are spaced apart and circumferentially distributed about part or all of the circumference of the plenum wall 35 (which in this example may be annular). Thus, in this embodiment, the apertures form an annular array of apertures which feed the cooling air into the cooling airflow passage 34. The apertures may be holes, slots, arcuate openings, etc. Accordingly, in a particular configuration, the inlet opening 32 may comprise a number of discrete arcuate slots, each of which extends partly circumferentially and is circumferentially spaced apart from circumferentially adjacent arcuate slots. Alternately still, the inlet opening 32 may comprise an array of openings which are circumferentially, radially and/or axially spaced apart within the plenum wall 35. Similarly, and regardless of the configuration selected for the inlet opening 32, the exit opening 36 may comprise a series of holes that are spaced apart and circumferentially distributed about part or all of the circumference of the turbine housing 30. Alternately, the exit opening 36 may comprise a number of discrete arcuate slots, each of which extends partly circumferentially and is circumferentially spaced apart from circumferentially adjacent arcuate slots. Alternately still, the exit opening 36 may comprise an array of openings which are circumferentially, radially and/or axially spaced apart within the turbine housing 30.

The present disclosure accordingly provides a passive cooling system 50 for optimizing the blade tip clearance 27 between the turbine blades 24 of a turbine rotor 20 and the surrounding turbine housing 30, and it does this by cooling the turbine housing 30 using passively induced and moved cooling air which cools the turbine housing 30 outside the main gaspath GP, and which cooling air is not extracted from the compressor section 14 of the engine. The flow of the high-speed gas past the holes results in a lower static pressure at the location of the holes which promotes flow through the air passage, cooling the housing and reducing the thermal growth of the housing and the resulting impact on the tip clearance. The induced cooling airflow CF within the cooing airflow passage 34 can additionally cool the surrounding casing(s) 46, which may form at least part of an outer boundary of the cooling airflow passage 34. By simultaneously cooling the surrounding casing(s) 46, overall material properties of the turbine assembly may be improved (e.g. for containment capability).

In a particular confirmation, the cooling airflow passage 34 of the passive cooling system 50 may be configured or otherwise formed such as to have a converging portion 60 and a diverging portion 62 (or indeed, more than one of each, such as to form several convergent-divergent nozzle portions 60, 62 in series), such that the cooling airflow CF flowing through these portions of the cooling airflow passage 34 is accelerated and decelerated, for example in order to provide a desired cooling air flow verity and/or pressure. More particularly, in a particular embodiment, the converging and diverging 60, 62 portions of the cooling airflow passage 34 are positioned such that the velocity of the cooling air CF within the cooling airflow passage 34 increases at one or more axial locations where the most heat is to be removed (e.g. such as at axial locations of the turbine housing 30 adjacent the blade tips 26). Accordingly, the passive flow of cooling air CF through the cooling airflow passage 34 can be used most effectively to optimize the tip clearance gap 27 between the blade tips 26 and the turbine housing 30.

In use, the present disclosure also provides a method of optimizing tip clearance between blades of a rotor and a surrounding housing in an aircraft engine. The method includes cooling the housing by directing a flow of cooling air through a cooling air passage, the cooling air passage located radially outward from the housing and outside a main gaspath directing combustion air through the blades of the rotor. The step of directing the flow of cooling air through the cooling air passage includes passively inducing the flow through the cooling air passage due to a pressure differential between an inlet opening of the cooling airflow passage defining a first static pressure and an exit opening of the cooling airflow passage defining a second static pressure. The inlet opening provides air flow communication from a source of cooling air into the cooling airflow passage, the exit opening providing air flow communication from the cooling airflow passage into the main gaspath downstream of the rotor. The source of cooling air providing non-core air at lower speed and a lower temperature than the combustion gas flowing through the main gaspath, the second static pressure being lower than the first static pressure due to the combustion airflow being of a higher speed than the non-core air of the source of cooling air.

It should be noted that the terms "upstream" and "downstream" used herein refer to the direction of an gas flow passing through the main annular gaspath of the gas turbine engine 10. It should also be noted that the term "axial", "radial", "angular" and "circumferential" are used with respect to a central axis 11 of the gas turbine engine 10. It should also be noted that expressions such as "extending radially" as used herein does not necessarily imply extending perfectly radially along a ray perfectly perpendicular to the central axis 11, but is intended to encompass a direction of extension that has a radial component relative to the central axis 11.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although a turbofan engine is depicted in FIG. 1 and described herein, it will be understood that the aircraft engine 10 of the present disclosure may comprise other types of gas turbine engines such as turboshafts, turboprops, auxiliary power units, etc., as well as hybrid aircraft engines (e.g. hybrid electric engines). Additionally, although the exemplary embodiments described above focus on tip clearance optimization between the blades 24 of a turbine rotor 20 and its surrounding turbine housing 30, it is to be understood that the principles described herein may also be applied to corresponding components of other rotors within the engine 10, such as an axial or centrifugal compressor, or other rotating components. Accordingly, in such an alternative embodiment, the rotors described herein are compressor rotors and the housing surrounding the rotors is a compressor housing, with the blade tip clearance between the blades of the compressor rotor and the compressor housing being optimized in the manner described herein. Yet further modifications could be implemented by a person of ordinary skill in the art in view of the present disclosure, which modifications would be within the scope of the present technology.

The invention claimed is:

1. A turbine assembly in a turbine section of an aircraft engine, comprising:

a turbine rotor including a hub and turbine blades extending outward from the hub to blade tips;

a turbine housing circumferentially extending and radially surrounding the turbine rotor, the turbine housing having an inner surface facing the blade tips of the turbine blades, a distance between the inner surface of the turbine housing and the blade tips of the turbine blades defining a tip clearance gap; and a passive cooling system for optimizing the tip clearance gap, the passive cooling system including:

a cooling airflow passage located radially outward from the turbine housing, the cooling airflow passage being in heat-transfer communication with the turbine housing, an inlet opening of the cooling airflow passage being located upstream of the turbine rotor and an exit opening of the cooling airflow passage being located downstream of the turbine rotor, the inlet opening providing air flow communication between a plenum receiving a cooling air and the cooling airflow passage, the exit opening located downstream of the turbine rotor and providing air flow communication between the cooling airflow passage and a main gaspath of the turbine section, the exit opening exposed to combustion gases flowing through the main gaspath past the exit opening to generate a local depression at the exit opening, the local depression defining a static pressure at the exit opening that is less than a static pressure of the cooling air at the inlet opening to induce a flow of the cooling air through the cooling airflow passage, thereby cooling the turbine housing.

2. The turbine assembly as defined in claim 1, wherein the plenum is in air flow communication with a source of cooling air that provides non-core air drawn from outside a core of the aircraft engine.

3. The turbine assembly as defined in claim 1, wherein the inlet opening comprises a plurality of apertures that are circumferentially distributed and extend through a plenum wall that at least partially encloses the plenum receiving the cooling air.

4. The turbine assembly as defined in claim 1, wherein the exit opening comprises a plurality of apertures that are circumferentially distributed and extend through the turbine housing downstream of the turbine rotor.

5. The turbine assembly as defined in claim 1, wherein the turbine housing at least partially defines the cooling airflow passage, with a radially outer surface of the turbine housing forming a boundary of the cooling airflow passage and being directly exposed to the cooling air flowing therewithin.

6. The turbine assembly as defined in claim 5, wherein uninterrupted conductive heat transfer occurs between the radially outer surface of the turbine housing and the radially inner surface of the turbine housing.

7. The turbine assembly as defined in claim 1, wherein the cooling airflow passage includes a converging portion and a diverging portion in serial flow communication within the cooling airflow passage.

8. The turbine assembly as defined in claim 7, wherein the converging portion and the diverging portion are located at an axial location of the turbine housing adjacent the blade tips of the turbine blades to increase velocity of the cooling air flowing through the cooling airflow passage near the blade tips.

9. The turbine assembly as defined in claim 1, wherein a casing is located radially outward of the cooling airflow passage and at least partially defines an outer boundary of the cooling airflow passage, the casing being cooled by the cooling air flowing through the cooling airflow passage.

10. An aircraft engine comprising:

a compressor section, a combustor and a turbine section, in serial flow communication, defining a core of the aircraft engine;

the turbine section including a turbine rotor, the turbine rotor including a hub mounted to an engine shaft for rotation therewith about a central axis, the turbine rotor including turbine blades extending outward from the hub to blade tips, the turbine blades projecting through a main gaspath of the turbine section and rotating with the hub about the central axis;

a turbine housing circumferentially extending and radially surrounding the turbine rotor, the turbine housing having an inner surface facing the main gaspath and being adjacent to the blade tips of the turbine blades, a distance between the inner surface of the turbine housing and the blade tips of the turbine blades defining a tip clearance gap; and a cooling airflow passage located radially outward from the turbine housing and outside the main gaspath, the cooling airflow passage being in heat-transfer communication with the turbine housing, the cooling airflow passage including an inlet opening located upstream of the turbine rotor and providing air flow communication between a source of cooling air and the cooling airflow passage, the source of cooling air providing non-core air from outside the core of the aircraft engine, the cooling airflow passage including an exit opening located downstream of the turbine rotor and providing air flow communication between the cooling airflow passage and the main gaspath downstream of the turbine rotor, wherein a pressure differential between the inlet opening and the exit opening induces a flow of the non-core air to flow through the cooling airflow passage from the inlet opening to the exit opening.

11. The aircraft engine as defined in claim 10, wherein the inlet opening provides air flow communication between a plenum located at least partially radially outward of the cooling airflow passage, the plenum receiving the non-core air from the source of cooling air therein.

12. The aircraft engine as defined in claim 11, wherein the source of cooling air feeding the plenum includes at least one of: a bypass duct of the aircraft engine; a take-off port located in an outer engine casing or in a nacelle of the aircraft engine; and an external air source outside the aircraft engine.

13. The aircraft engine as defined in claim 10, wherein the inlet opening comprises a plurality of apertures that are circumferentially spaced apart.

14. The aircraft engine as defined in claim 10, wherein the exit opening comprises a plurality of apertures that are circumferentially distributed and extend through the turbine housing downstream of the turbine rotor.

15. The aircraft engine as defined in claim 10, wherein the turbine housing at least partially defines the cooling airflow passage, with a radially outer surface of the turbine housing forming a boundary of the cooling airflow passage and being directly exposed to the cooling air flowing therewithin.

16. The aircraft engine as defined in claim 15, wherein uninterrupted conductive heat transfer occurs between the radially outer surface of the turbine housing and the radially inner surface of the turbine housing.

17. The aircraft engine as defined in claim 10, wherein the cooling airflow passage includes a converging portion and a diverging portion in serial flow communication within the cooling airflow passage.

18. The aircraft engine as defined in claim 17, wherein the converging portion and the diverging portion are located at an axial location of the turbine housing adjacent the blade tips of the turbine blades to increase velocity of the cooling air flowing through the cooling airflow passage near the blade tips.

19. A method of optimizing tip clearance between blades of a rotor and a surrounding housing in an aircraft engine, the method comprising:

cooling the housing by directing a flow of cooling air through a cooling airflow passage, the cooling air passage being located radially outward from the housing and outside a main gaspath directing combustion air through the blades of the rotor, the directing of the flow of cooling air through the cooling air passage includes passively inducing the flow of cooling air through the cooling air passage due to a pressure differential between a first static pressure at an inlet opening of the cooling airflow passage and a second static pressure at an exit opening of the cooling airflow passage, the exit opening feeding the flow of cooling air into the main gaspath at a location downstream of the rotor.

20. The method of claim 19, further comprising directing the cooling air into the cooling airflow passage, via the inlet opening, from a source of non-core air, the source of non-core air being at lower speed and a lower temperature than the combustion air flowing through the main gaspath.

\* \* \* \* \*